Feb. 19, 1935. R. K. HOPKINS 1,991,556
MANUFACTURE OF PRESSURE VESSELS
Filed Oct. 8, 1932 2 Sheets-Sheet 1
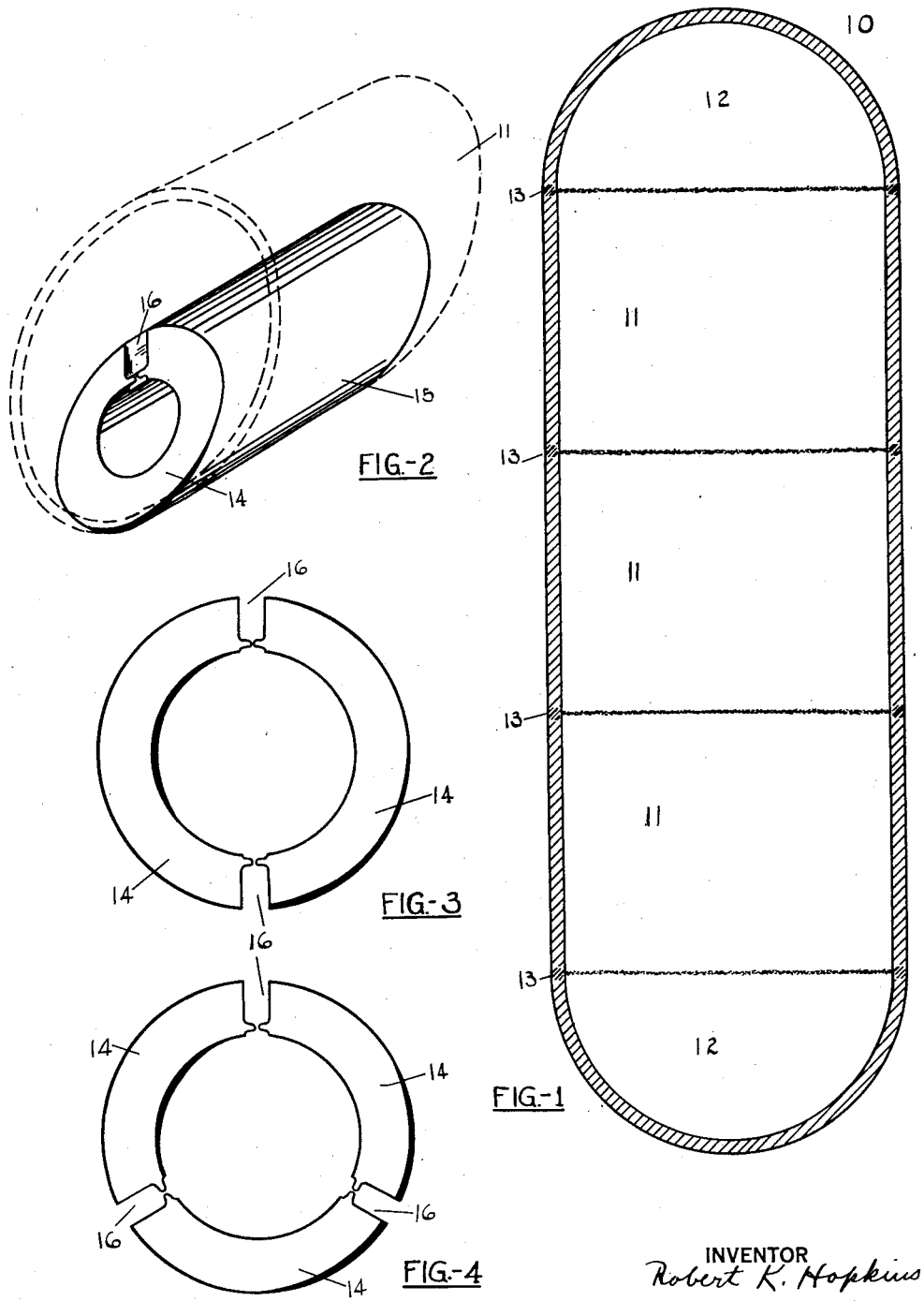

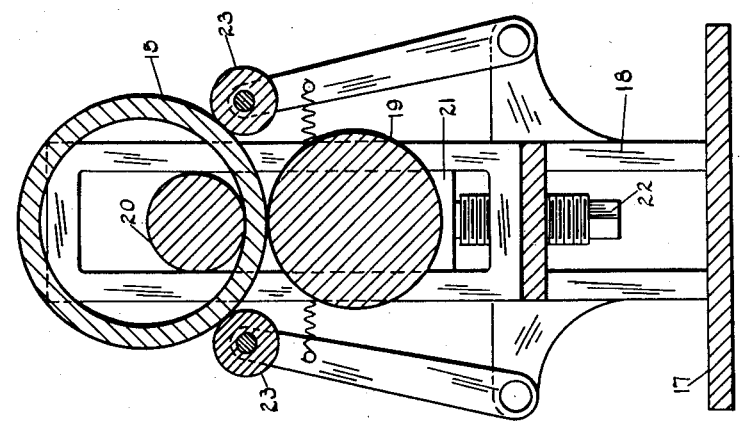
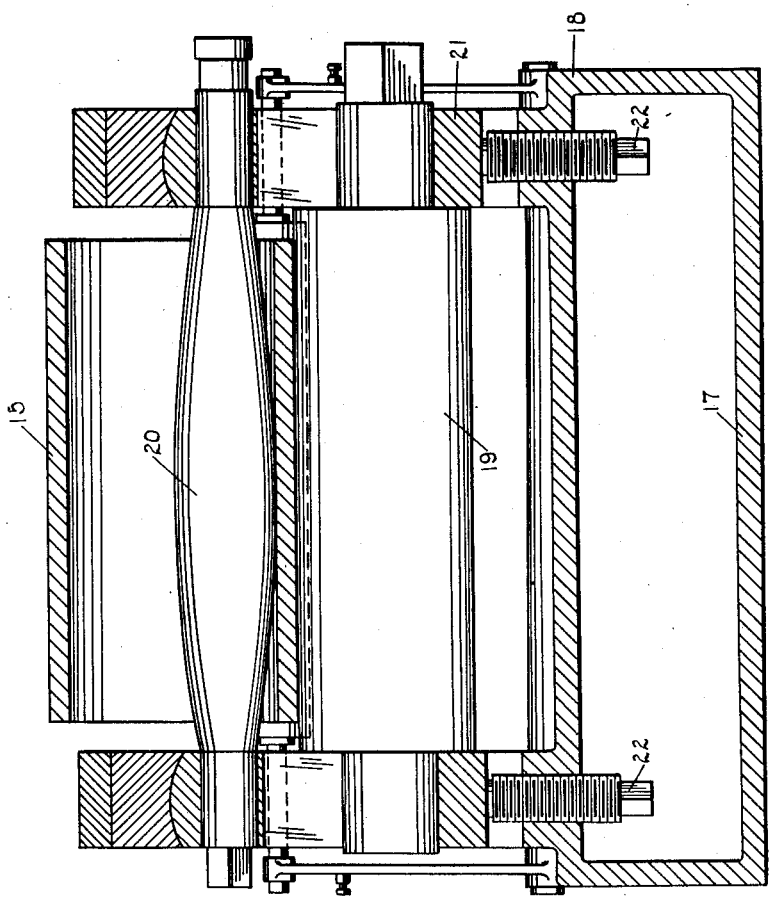

Patented Feb. 19, 1935

1,991,556

UNITED STATES PATENT OFFICE 1,991,556

MANUFACTURE OF PRESSURE VESSELS

Robert K. Hopkins, New York, N. Y., assignor to M. W. Kellogg Co., New York, N. Y., a corporation of Delaware Application October 8, 1932, Serial No. 636,818

8 Claims. (Cl. 29—148.2)

This invention relates in general to cylindrical pressure vessels and in particular to the manufacture of vessels such as pen stocks, fluid containers, cracking chambers, stills and the like of large diameter adapted for service under high pressure and severe stresses.

It has been proposed to manufacture cylindrical vessels, such as are contemplated herein (1) by joining curved plates together by hammer weld or forge weld methods; (2) by electrically welding together the component parts of the vessel, the parts being either cylindrical or long longitudinal troughs and being formed either by casting or by bending plate; (3) by joining the component parts together by Thermit casting, the parts being either cylindrical or long longitudinal troughs and being formed either by casting or by bending plate. In connection with the third method it has recently been proposed, see the Lewis Patent No. 1,779,607, to form the component parts of the vessel of bent plate and of such size that when they are assembled and joined the resulting vessel is of a diameter smaller than the final vessel, and then working the vessel thus formed, as by a forging operation in accordance with ordinary practice, i. e. forging on a mandrel, etc. to increase the diameter of the vessel to the size desired and to lessen the thickness of the cast metal of the joints, thereby improving the texture of the coarse, more or less porous cast metal.

The forge or hammer weld processes mentioned above, because of their very nature, are limited to comparatively thin plates as it is practically impossible to hammer or forge weld plates having the thickness required by the vessels contemplated by this invention and secure perfect joints. Furthermore, the cost of welding thick plates by these processes would be prohibitive.

Aside from the practical difficulties involved in casting the cylindrical or trough-like parts mentioned under (2) and (3) above, it is not believed that the joining of such parts by electrical welding or by Thermit casting to form a pressure vessel of the type contemplated by this invention, would result in the production of a satisfactory and safe vessel due to structural weakness resulting from the casting operation. The possibility of porosity of the cast steel and of a poor and non-uniform molecular structure would render such cast parts unsuitable for constructing a vessel used in connection with fluids at high pressure.

The electric welding methods numbered (3) above, wherein the side of several long trough like plates are joined together to form a pressure vessel, or wherein the ends of curved plates are welded to form cylinders which are welded together to form a pressure vessel, might possibly be employed for joining relatively thick plates, but the strength of the pressure vessel formed by these methods is limited due to the longitudinal, with respect to the axis of the cylindrical vessel, seams or welds by which the plates are joined.

The greatest stress at any point in the wall of a cylindrical pressure vessel is exerted in a direction tangent to the wall of the cylinder and perpendicular to a line passing through or parallel to the axis of the cylinder. This stress is known as the circumferential wall stress, since its direction is around the wall of the cylinder. Longitudinal welds constitute rigid sections which concentrate the stresses adjacent thereto, thus producing a tendency to rupture the vessel along a line parallel and adjacent to the longitudinal weld. Furthermore, the longitudinal welds in contracting distort the plates and cause stresses to be set up adjacent the welds which cannot be entirely eliminated by the stress relieving operations of the present day practice. Therefore, it will readily be seen that pressure vessels formed by methods resulting in longitudinal welds, as above described, are unsatisfactory for severe duty from the standpoint of safety requirements.

It is believed that the joining of the parts of the vessel by Thermit casting, as under (3) above, would not result in the production of a satisfactory and safe pressure vessel due to structural weaknesses inherent in the cast joining metal. The possibility of porosity and of poor and non-uniform molecular structure of the cast joining metal would render the vessels unsafe and of uncertain strength.

It is also believed that the method proposed in the Lewis Patent No. 1,779,607 would not result in the production of a satisfactory and safe vessel. It is true that the working of the vessel after the parts have been joined tends to improve the character of the cast metal of the joints, but such working cannot make the cast metal as strong as the plate of the parts.

In my prior application Serial No. 553,727 filed July 29, 1931, I have disclosed a method for manufacturing pressure vessels of the type mentioned above by means of which it is possible to produce pressure vessels of strength and safety far in excess of the strength and safety of the vessels produced in accordance with the prior methods of the art.

The present invention has for an object a method for manufacturing pressure vessels of the type referred to, by means of which it is possible to produce pressure vessels having strength and safety characteristics superior to the strength and safety characteristics of the vessels which can be produced by the methods now known to the art and which, though not as strong nor as safe as the vessels which can be produced by the method of my prior application, above identified, compare favorably therewith and can be produced at a much lower cost.

The fact that vessels produced in accordance with the method of this invention are not as strong nor as safe as the vessels produced in accordance with the method of my said prior application is not due to any fault of the present method but rather is due to the fact that billets of killed steel are inherently stronger than steel plate. However, as the cost of billet steel is so much more than plate steel and the vessels produced by the method of this invention are stronger and safer than similar vessels produced by the methods of the prior art, the vessels produced by the method of this invention may cheaply and advantageously be used in all cases except those where extreme safety under excessive stresses is required.

In accordance with my present invention I form a thick-walled cylinder of a diameter considerably smaller than the diameter of the vessel to be fabricated and having the metal required by a section of the same length of the vessel to be fabricated, by shaping one or more thick plates and joining their meeting edges by depositing therebetween the molten metal flowing from a fusible weld-rod. I then bring the thick-walled cylinder to a hot working temperature and roll it without increasing its length to the diameter of the vessel to be fabricated. To form a long cylinder, I may assemble a plurality of such annular sections of like diameter adjacent to each other in axial alignment. Preparatory to or after the alignment of the annular sections I cut away portions of the metal at the ends of the sections so that when they are aligned in abutting relation a welding groove is provided. I weld the ends of the annular sections in the region of the groove by means of an electric arc, employing a fusible weld-rod to unite the annular sections to form an integral cylinder. By reason of the rolling of the sections the longitudinal welds are no longer present as such and the cylinder entirely lacks rigid stress concentrating longitudinal sections. The cylinder may be used as pen-stock, or the like or completed for use as a closed pressure vessel by attaching suitable heads to the ends thereof, such heads being joined to the ends by circumferential welds.

My present invention overcomes all of the difficulties outlined above as experienced in connection with pressure vessels of the type contemplated, constructed as heretofore proposed, and provides an economical construction of thick-walled pressure vessels of large diameter, capable of being used under high pressures and severe stresses, and free from rigid stress concentrating longitudinal sections or other structural defects.

In the drawings:

Figure 1 is a longitudinal sectional view along the center line of a pressure vessel constructed in accordance with my invention.

Fig. 2 is a perspective view showing in solid lines a heavy-walled annulus prior to rolling, and in dotted lines a rolled annular section of finished size.

Figs. 3 and 4 are front views of heavy walled annulae formed from two and three plate sections respectively.

Fig. 5 is a sectional elevation of a rolling mill especially adapted to roll the annular sections, and Fig. 6 is a transverse sectional view of the rolling mill of Fig. 6.

Referring more particularly to the drawings, Fig. 1 shows a pressure vessel 10 the body of which comprises a plurality of annular sections 11 and heads 12 joined to form an integral structure by means of circumferential welds 13 and 13$^1$.

To form sections 11 a thick plate 14, as in Fig. 2, or a plurality of thick plates 14, as in Figs. 3 and 4, are bent to form an annulus 15 of substantially the same length as section 11. The longitudinal edges of plate or plates 14 are cut before or after bending of plate or plates 14 to form a welding groove or welding grooves 16 in which is deposited fusing metal from a fusible electrode by means of an electric arc. Annulus 15 is of smaller diameter than the desired section 11 and is of such thickness as to contain the same amount of metal as desired section 11. Whenever possible, plate or plates 14 are so bent that the fibre of the metal runs circumferentially of annulus 15.

After annulus 15 is formed, as just described, it is heated to a temperature suitable for hot working and then rolled to bring it to the desired diameter and wall thickness. In order to produce the results intended, it is necessary that the rolling of annulus 15 be such that the fibres of the metal are developed circumferentially, otherwise the resulting section 11 will not have its greatest strength in the direction to resist the greatest disruptive forces. To develop the fibres of the metal as just mentioned, I roll annulus 15 in the mill shown in Figs. 5 and 6. This mill is fully described in my copending application Serial Number 481,392, filed September 12, 1930, and therefore its construction and operation will only be briefly described herein, as reference may be had, if desired, to said application for a more complete description.

Referring to Figs. 5 and 6, a rolling mill is shown having a base 17 with suitable standards 18 to support the bearings of rolls 19 and 20. The bearings 21 are adapted for vertical movement in the standards 18 and the rate and amount of this movement is controlled by the screws 22. Suitable means, not shown, but preferably power driven, are provided for operating the screws 22 by means of which the rolling pressure is controlled as will be evident hereafter. The bearings 21 for the roll 20 are of the ball and socket type in order that this roll may be flexed without undue strain on the journals of the roll.

The bearings 21 are such that the roll 20 may be easily demounted for the insertion of the annulus 15 which is to be worked. In Fig. 6 a pair of auxiliary rolls 23 are shown which support the annulus 15 centrally on the roll 19 and means are provided associated with the rolls 23 to permit them to swing outwardly to compensate for the increase in the radius of curvature of annulus 15 as the rolling progresses.

The rolling operation is carried out as follows: The roll 20 is withdrawn and the hot annulus 15 positioned on the roll 19 supported by the auxiliary rolls 23. The roll 20 is then inserted through the hole of annulus 15 and firmly secured in its bearings.

The rolling operation is then started with the pressure on the roll 20 regulated to give a straight line rolling contact to thus ensure even pressure on annulus 15. Rolling with this pressure is continued until it is noticed that annulus 15 is not rolling in a truly cylindrical form, in which case the control is regulated to flex the roll 20 for correcting the rolling condition, as fully described in my prior application last mentioned.

An important advantage obtained by rolling sections 11 from annulæ 15 on a mill of the type described which is not obtainable with any other type of mill known to the art is that because of the fact that the annulæ 15 are rolled on the mill, without being passed therethrough with a consequent elongation of the metal, the metal fibres are developed circumferentially of sections 11 and thus increase the structural resistance of the sections to disruptive forces. It is to be noted that the effect of the rolling is not confined to metal of original plate or plates 14 and the reduction in thickness and development of circumferential fibres also takes place in the weld metal deposited in welding groove or grooves 16. Hence during the rolling the weld metal, which in most cases is as dense and as strong as the metal of plate or plates 14, is brought to the same thickness as the rest of the metal, so that the final section 11 is devoid of all rigid longitudinal sections which serve to concentrate the stresses and tend to cause rupture on lines parallel thereto. Sections 11 therefore closely approximate the seamless sections described in my said copending application first mentioned, the difference in strength being due primarily to the inherently imperfect plate metal.

The annular sections 11 which I am enabled to produce by rolling the annulæ 15 on a rolling mill of the type described may be of such wall thickness as required to produce a structure of the strength necessary to withstand the high service pressures encountered and of such diameter as to be economical from the view point of their capacity. For example, I may roll sections 11 having a diameter of about twelve feet with a wall thickness of three inches. On smaller diameters such as five feet, the wall thickness may be as much as ten inches. The minimum wall thickness to which I deem it desirable to roll sections 11 is about one inch, which, for example, might be used with a diameter of about thirty inches.

A single section 11 produced in accordance with my invention may be employed as a relatively short conduit or formed into a closed pressure vessel by welding heads to each end, in the manner described hereafter. The length of each section 11 is of course limited by the size of the rolling mill which ordinarily does not exceed ten feet.

To form a pressure vessel of greater length than that of a single section 11, the ends of several sections 11, of like diameter and wall thickness, are partially cut away so that when said several sections 11 are assembled in abutting relation and axial alignment, circumferential welding grooves are provided between adjacent sections. Fusing metal is then deposited in these welding grooves by electric welding with a fusible weld-rod to form circumferential welds 13 which unite the adjacent sections 11 into an integral cylinder. Such an integral cylinder may be used in a pen-stock, or for other purposes which require conduits of large diameter and great strength, or to form the body of closed pressure vessel 10 of Fig. 1.

When an integral cylinder made up of several sections 11, as described above, is to be utilized as the body of closed pressure vessel 10, pressure vessel 10 is completed by joining heads 12 to the cylinder by means of circumferential welds $13^1$ similar to the welds 13 which unite sections 11. Since the rolling eliminates the longitudinal welds as such, completed vessel 10 includes only circumferential welds 13 and $13^1$ which coincide with the direction of the maximum wall stress caused by fluids under pressure. Hence, the rigidity of such circumferential welds does not act to lessen the structural strength of the vessel, as is the case with longitudinal welds paralleling the axis of the vessel.

I claim:

1. The method of manufacturing a thick walled annular section, which comprises bending plate of a thickness greatly in excess of the thickness of the desired annular section to form a cylinder of the length of the annular section, depositing fusing metal by means of an electric arc between the abutting edges of said plate to form an integral structure and working said cylinder to materially reduce the thickness thereof and to form said annular section without substantially increasing its length.

2. The method of manufacturing a thick walled annular section, which comprises bending plate of a thickness greatly in excess of the thickness of the desired annular section along the length of the fibre thereof to form a cylinder of the length of the desired annular section and having the metal fibre disposed circumferentially, depositing fusing metal by means of an electric arc between the abutting edges of said plate to form an integral structure and working said cylinder to materially reduce the thickness thereof and to form said annular section without substantially increasing its length.

3. The method of manufacturing a thick walled annular section, which comprises bending plate of a thickness greatly in excess of the thickness of the desired annular section along the length of the fibre thereof to form a cylinder of the length of the desired annular section and having the metal fibre disposed circumferentially, depositing fusing metal by means of an electric arc between the abutting edges of said plate to form an integral structure, heating said cylinder to a hot working temperature, and working said cylinder to materially reduce the thickness thereof and to form said annular section without substantially increasing its length.

4. The method of manufacturing a thick walled annular section, which comprises bending a plate of a thickness greatly in excess of the thickness of the desired annular section or plates to form a cylinder of a diameter materially less than the diameter of the desired annular section and of a length substantially equal to the length of said section, depositing fusing metal between the contiguous edges of said plate or plates to form a unitary structure containing the metal of said section, and reducing the thickness and increasing the diameter of said cylinder to the thickness and diameter of said section by working without substantially altering the length of said cylinder.

5. The method of manufacturing a thick walled annular section having a large diameter, which comprises bending plate of a thickness greatly in excess of the thickness of the desired annular section to form a cylinder of the same length as the desired section, depositing fusing metal by means of an electric arc between the abutting edges of said plate to form an integral structure, and forming a substantially seamless annular section having a uniform molecular structure with the metal fibres developed circumferentially of said section by rolling said cylinder to finished size on a mill without passing said cylinder through the mill.

6. The method of manufacturing a thick walled closed pressure vessel substantially devoid of longitudinal joints from plate of a thickness greatly in excess of the thickness of said vessel, which comprises bending the plate to form a cylinder, depositing fusing metal by means of an electric arc between the contiguous edges of said plate to form an integral structure, forming a thick walled substantially seamless annular section of the diameter of the closed vessel by rolling said cylinder to finished size on a mill without passing said cylinder through said mill, welding heads to the ends of said section to form an integral closed pressure vessel substantially devoid of longitudinal seams or welds.

7. The method of manufacturing an elongated pressure vessel substantially devoid of longitudinal joints from plate of a thickness greatly in excess of the thickness of said vessel, which comprises bending plate to form a plurality of cylinders, depositing fusing metal by means of an electric arc between the contiguous edges of the plate of said cylinders to form each of said cylinders into an integral structure, forming a plurality of thick walled substantially seamless annular sections by rolling said cylinders to finished size on a mill without passing said cylinders through the said mill, cutting away portions of the ends of said annular sections to form complementary parts of welding grooves, assembling said sections in axial alignment to form a tubular structure having circumferential welding grooves, and depositing fusing metal in said welding grooves by means of an electric arc to unite said sections into an integral structure.

8. The method of manufacturing an elongated thick walled closed pressure vessel substantially devoid of longitudinal joints from flat plate of a thickness greatly in excess of the thickness of said vessel, which comprises bending plate to form a plurality of cylinders, depositing fusing metal by means of an electric arc between the contiguous edges of the plate of said cylinders to form each of said cylinders into an integral structure, forming a plurality of thick walled substantially seamless annular sections by rolling said cylinders to finished size on a mill without passing said cylinders through said mill, assembling said sections in axial alignment to form a tubular structure, welding the abutting edges of said sections to unite said sections, and welding heads to the ends of said tubular structure to form an integral closed pressure vessel substantially devoid of longitudinal seams or welds.

ROBERT K. HOPKINS.

CERTIFICATE OF CORRECTION.

Patent No. 1,991,556.  February 19, 1935.

ROBERT K. HOPKINS.

It is hereby certified that error appears in the printed specification of the above numbered patent requiring correction as follows: Page 3, second column, line 58, claim 4, strike out the words "or plates" and insert the same after the word "plate" in line 56, of said claim; and that the said Letters Patent should be read with this correction therein that the same may conform to the record of the case in the Patent Office.

Signed and sealed this 21st day of May, A. D. 1935.

(Seal)

Leslie Frazer
Acting Commissioner of Patents.